United States Patent [19]

Mino et al.

[11] Patent Number: 4,697,355
[45] Date of Patent: Oct. 6, 1987

[54] METHOD AND INSTALLATION FOR DRYING A CONTINUOUS MATERIAL IMPREGNATED WITH A HARDENABLE SYNTHETIC RESIN

[75] Inventors: Takeyasu Mino, Kobe; Mitsuaki Harada, Ashiya, both of Japan

[73] Assignee: Sinter Limited, Bristol, United Kingdom

[21] Appl. No.: 717,836

[22] Filed: Mar. 29, 1985

[30] Foreign Application Priority Data

Apr. 2, 1984 [JP] Japan .............................. 59-048635[U]
Apr. 2, 1984 [JP] Japan .............................. 59-048636[U]

[51] Int. Cl.$^4$ ................................................. F26B 3/30
[52] U.S. Cl. ............................................ 34/41; 34/68; 34/155
[58] Field of Search ................... 34/86, 4, 41, 77, 76, 34/155; 432/206, 202

[56] References Cited

U.S. PATENT DOCUMENTS 3,112,919 12/1963 Gunow ............................... 432/206
3,793,741 2/1974 Smith, Jr. ............................. 34/68

FOREIGN PATENT DOCUMENTS 498463 9/1954 Italy ........................................ 34/68

Primary Examiner—Larry J. Schwartz
Attorney, Agent, or Firm—Wenderoth, Lind & Ponack

[57] ABSTRACT

The present invention relates to a method and apparatus for drying a continuous material impregnated with a hardenable synthetic resin. The material is moved through at least one treating chamber within which radiant heat is applied onto the material and into which air is introduced in order to dilute the gaseous substances generated during the drying process and to at least partially exhaust them. The method is characterized in that heat is applied onto the continuous material in the form of radiant heat, and in that air is conducted in a controlled manner into the treating chamber as preheated fresh air and is guided to form a laminar air current that is substantially parallel to the continuous material as is possible. The installation has in the treating chamber (10, 11) at least one radiant heater (34, 36) and at least one fresh air inlet device (26) which is connected with a controlled fresh air supply device (40) and a heating device (38).

17 Claims, 5 Drawing Figures

METHOD AND INSTALLATION FOR DRYING A CONTINUOUS MATERIAL IMPREGNATED WITH A HARDENABLE SYNTHETIC RESIN

The invention relates to a method as well as an installation for drying a continuous material impregnated with a hardenable synthetic resin, for example for producing prepreg. In this drying process, the continuous material is moved through at least one treating chamber inside of which heat is applied onto the continuous material and into which air is introduced in order to dilute and at least partially remove the gaseous substances generated during this process.

The corresponding installation has at least one treating chamber, a device for applying heat onto the continuous material, and a device for removing the gaseous substances generated during the drying process and which have been diluted with air from the treating chamber.

In a known process and a known installation of the above described type (EP-B-0035682), air is blown into the treating chamber and onto the continuous material in large quantities and at high speed, in order to effectively drive the solvent out of the synthetic resin, the air contents in the treating chamber being controlled so that the concentration of the expelled solvent is maintained at a level at which there is no danger of explosion.

Although this installation is relatively efficient, it poses problems, because of the large amounts of air and the high speeds at which the air is blown and the accompanying turbulence, both with regard to product quality as well as with regard to the resulting relatively large amounts of contaminated air which naturally must be purified.

The object of the invention is to provide a method and an installation of the above described type which can optimize the drying process with regard to high throughput capacity, can maintain a good product quality and also, with regard to purification of the contaminated air, to avoid environmental pollution.

In accordance with the invention, the method solves this problem in that the heat is applied onto the continuous material in the form of radiant heat and air is conducted into the treating chamber in a controlled manner as preheated fresh air and is directed in a laminar current substantially parallel to the continuous material and along the latter.

As a result, resin particles are not blown off the surface of the continuous material, else they could settle on the walls of the treating chamber and, if this were the case, the resin particles would in time harden and carbonize. The carbonized resin particles could, in this condition, become detached from the walls of the treating chamber and settle on the continuous material, producing so-called black spots on the end product. These so-called black spots are effectively avoided in the present invention. Thus, it also is unnecessary to interrupt from time to time the operation of the installation of the invention to remove the settled resin particles.

Since fresh air is injected at a relatively low speed and in a laminar current, there is no fluttering of the continuous material which under certain circumstances could result in a poor quality of the product. Neither do the particular flow conditions of fresh air induce any irregular tensions in the continuous material which could result in warping or damage to the relatively thin material. The only tensions are those induced by the own weight of the continuous material, but they are uniformly distributed and cause no damage.

Due to the laminar flow conditions as well as the insufflation of preheated fresh air, and because hot air is not blown directly on the continuous material, there is no skin formation of the damp resin of the material, which would above all prevent expulsion of the solvent from the resin. Such a skin would lock the solvent in and later on, when the solvent passes into the vaporous state, would cause the surface to tear resulting in so-called pinholes. Also, the locked-in solvent would act as a "brake". The present invention prevents these phenomena.

Altogether, the invention creates optimal conditions by achieving a relatively high flow rate at a low height of the treating chamber, advantageous exhaust air conditions and improved product quality. This optimal result could be explained in part in that, diverting from conventional procedures, the cooperation of radiant heat with the relatively highly preheated fresh air results, on the one hand, in the continuous material being heated rapidly and, on the other hand, in drying from the inside to the outside without the above mentioned skin formation and without occurrence of the so-called pinholes in the finished product. It should further be mentioned that the method in accordance with the invention can shorten the gelling time of the synthetic resin used.

Preferably, the preheated fresh air has a temperature within the range of the radiant heat temperature. This means that the continuous material is not heated slowly, as has hitherto been the case. It has been found that relatively rapid heating of the material together with the other features of the invention prevents the above mentioned surface skin formation.

For example, the fresh air temperature can be within the range of 140° C. to 180° C., and particularly about 160° C., and the radiant heat temperature may be within the range of 160° to 200° C., and particularly about 180° C.

In contrast to the state of the art, much lower air speeds are employed. The flow rate of the fresh air is between 1 to 3 m/sec, in contrast to 10 to 30 m/s in the case of the state of the art, and fresh air is insufflated in a quantity such that, referring to the explosion limit, a threefold to fourfold factor of safety is obtained.

For example, by introducing into the treating chamber about 5% more air than is evacuated from it, a slight excess pressure prevails in the treating chamber in relation to the environment. As a result of such excess pressure, cold secondary air cannot enter the treating chamber at unavoidable leakage places, for example at the entrance and exit places of the continuous material. This results in establishing uniformity of the drying and polymerization process.

In the event that the continuous material is moved upwardly through the treating chamber from below and, after reversal, from above through a further treating chamber downwardly, the material is preferably cooled in a cooling zone prior to reversal. Such cooling can be done with ambient air. Although a part of the heating stretch is thereby claimed for the drying process, cooling surprisingly enables a higher throughput speed of the continuous material and leads to a better quality of the product. Further, this results in better exploitation of the treatment in the above mentioned additional treating chamber in which the material moves downwardly from above. Also, the overall height of the installation can be reduced since reversal occurs sooner and the section of movement from downwardly above can therefore be more intensively exploited.

In accordance with a further embodiment of the invention, the continuous material is heated differentially over its width, that is, a specific temperature profile is generated over the width of the material, so that a differential drying process is obtained over the width of the material with the result that the flow properties of the dried material vary over its width. A flow behavior different from that in the central area may be selected particularly along the edges of the continuous material.

Finally, it is possible, in the case of large air requirements, to introduce fresh air into the treating chamber at at least two different places, for example where the material enters the treating chamber and in an intermediate area. As a result, lesser quantities of air need to be introduced at these locations, so that the requirement of laminar flow may be met.

The invention solves the problem further with an installation which is characterized in that at least one radiant heater is provided as the device for applying heat onto the continuous material moving through the treating chamber and that at at least one place in the treating chamber a fresh air inlet device is disposed which is connected with a controlled fresh air supply device and a heating device.

The radiant heater comprises at least one conduit through which a heating medium flows and which is disposed in a serpentine manner on opposite walls of the treating chamber. In particular, the conduit is covered toward the continuous material by a reflecting plate with the result that the conduits do not project into the interior of the treating chamber. Disturbing turbulence in the air flow is thereby prevented. Also, the covering reflecting plate brings about an advantageous heat irradiation of the continuous material.

In connection with this solution, the conduit may be embedded in the walls of the treating chamber.

For differential drying in the direction of movement of the continuous material or transversely thereto, it is possible to either differentiate the pitch of the serpentine-shaped conduit, or provide a plurality of separately and differentially fed conduits may in the direction of movement of the material or transversely thereto. As already mentioned, this renders differential drying over the width of the material possible so that the material exhibits a differential flow rate or differential gelling times over its width. Further, it is possible with this device to influence the resin flow on the left, in the middle, or on the right during operation of the installation.

In accordance with a further, very essential embodiment of the invention, the treating chamber is installed in a sealed insulated space filled with hot air. When the air temperature in the treating chamber is about 180° C., the air temperature in this insulated space is about 90° C. This type of installation in the form of an "oven-within-oven" has various advantages. One advantage is a better uniformity and stabilization of temperature conditions within the treating chamber. Further, polluted air leaking out of the treating chamber may be collected and directed to a purifying device. This creates environmentally pleasant operational conditions together with the fact that the amount of polluted air to be purified is relatively small.

The invention is explained in greater detail in the following description in connection with the embodiments represented purely schematically in the drawings.

Figure 1:
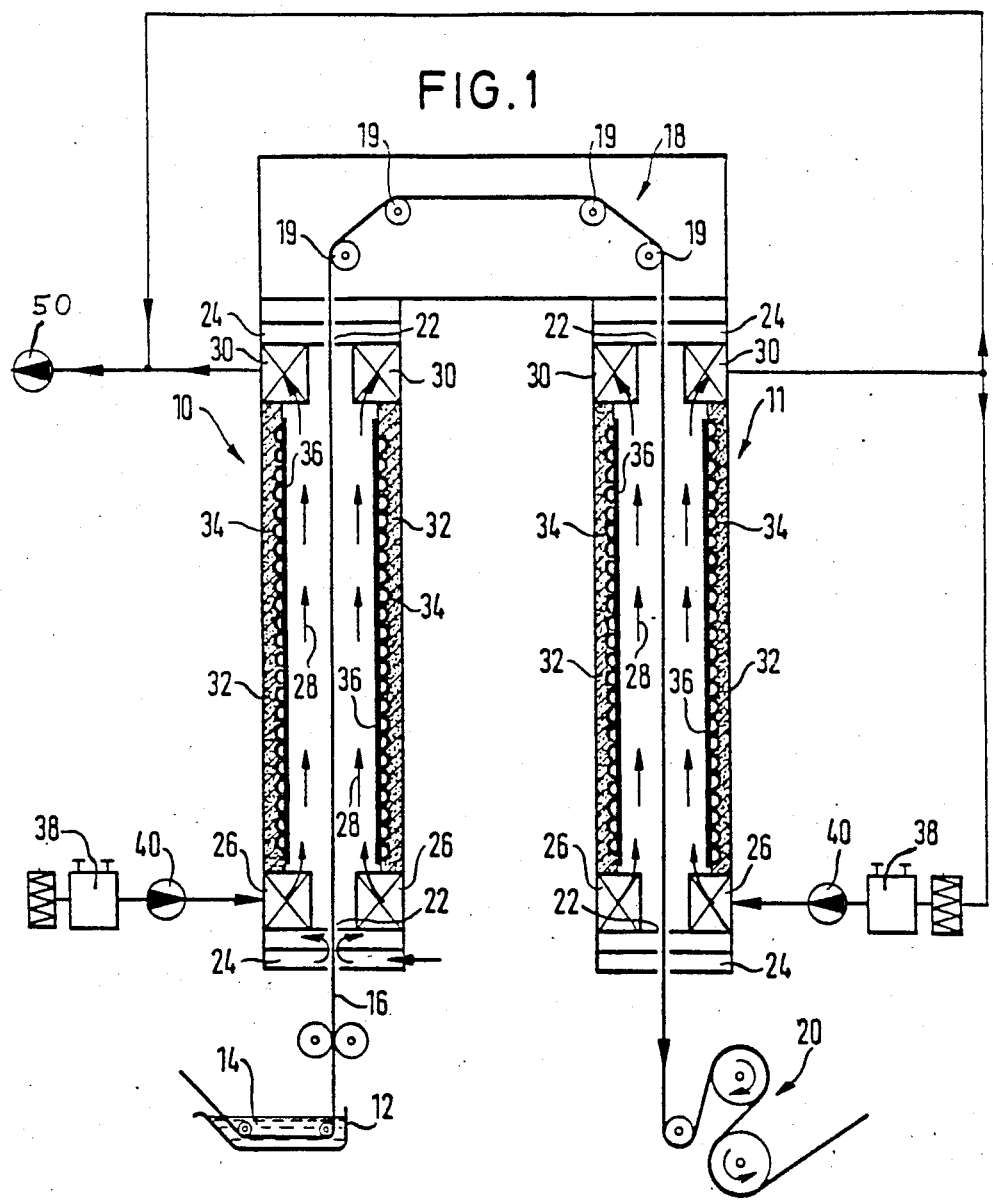
FIG. 1 is a schematic longitudinal sectional view through an installation for drying a continuous material impregnated with a hardenable synthetic resin.

The invention according to FIG. 1 comprises two treating chambers 10 and 11. In series with the treating chamber 10, an impregnating bath 12 is provided containing a synthetic resin 14. A continuous material 16 runs through the impregnating bath, then through the treating chamber 10 upwardly from below, then through a reversing device 18 with guide rollers 19, and thereupon through the treating chamber 11 downwardly from above. Behind the chamber 11, the continuous material is drawn off over a roller system 20 and conveyed for further treatment.

Except for the points of passage 22 for the continuous material 16 at the ends of the treating chambers, the treating chamber is substantially sealed. In the region of each of said points of passage 22, a lock 24 is provided on which a sealing air curtain is formed by means of an air current which substantially prevents air from leaving the treating chamber to atmosphere. In the area of the lower points of passage 22 of the treating chambers, air inlet boxes 26 are disposed on both sides of the continuous material through which preheated air is introduced upwardly from below and parallel to the material 16. According to the arrows 28, air flows through the treating chamber in a laminar flow from upwardly to the upper air outlet boxes 30.

In the opposite side walls 32 of the treating chambers 10 and 11, a serpentine shaped conduit 34 is embedded through which a heating medium flows. The close turns of the conduit are covered on the side of the continuous material by a reflecting plate 36.

Oil flowing in the conduit 34 uniformly heats the reflecting plate 36 and directs radiant heat in direction of the continuous material 16 moving through the treating chamber.

Fresh air insufflated through the air inlet boxes 26 is preheated in a heat exchanger 38 and then insufflated into the treating chamber by means of a blower 40 in the manner described.

Figure 2:
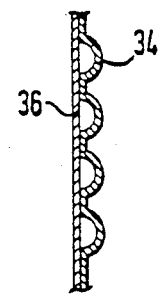
FIG. 2 is a partial section through the conduit through which a heating medium flows, with a reflecting plate covering the conduit.

FIG. 2 is a detailed view of the design of the conduit 34 through which oil flows, together with the reflecting plate 36. The reflecting plate 36 forms a smooth boundary wall of the treating chamber which does not generate turbulence in the air movement.

Figure 3:
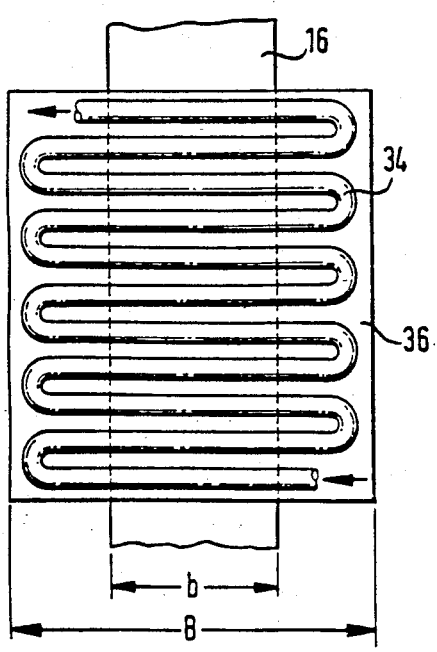
FIG. 3 is a partial view of a serpentine-shaped conduit through which a heating medium flows.

FIG. 3 shows schematically the serpentine-shaped configuration of the conduit 34 in combination with the reflecting plate 36 in relation to the continuous material 16. It is found that, to create stable temperature conditions, the width b of the material is substantially smaller than the width B of the reflecting plate 36.

Figure 4:
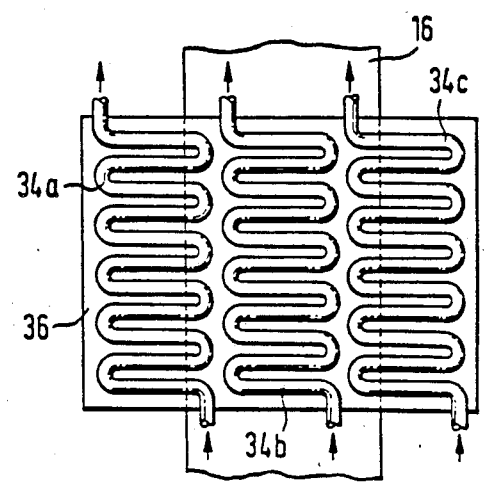
FIG. 4 is further embodiment of the conduit through which a heating medium flows.

A different embodiment is shown in FIG. 4. Three parallel serpentine-shaped conduits 34a, 34b and 34c are shown there disposed in the direction of the width of the continuous material. Flow through these various conduits occurs separately from each other, so that heat radiation conditions may differ over the width of the continuous material. For example, in the illustrated example the edges of the material can be influenced and dried by the conduits 34a and 34c in a manner different from the center region of the material 6 by the conduit 34b.

Figure 5:
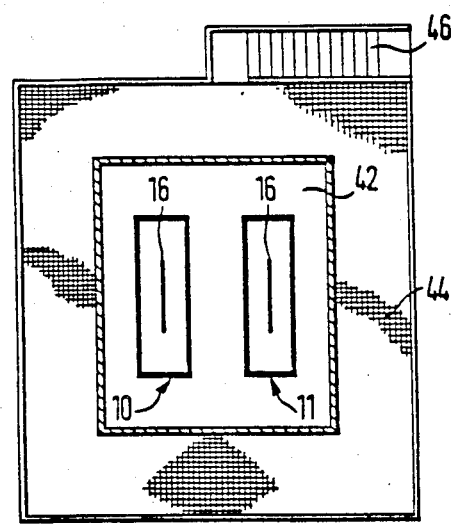
FIG. 5 is a schematic cross-section through a drying installation.

FIG. 5 shows a cross-section of the total installation with the two treating chambers 10 and 11 through which the continuous material moves. According to the already mentioned "oven-within-oven" principal. the treating chambers 10 and 11 are located in an insulating space 42 where air heated to for instance 90° C. is present. Around this towerlike structure, a platform 44 is disposed which is accessible by stairs 46.

Finally, FIG. 1 shows the details of air conduction. According to that Figure, spent air from the treating chamber 10 is is conducted via an exhaust air ventilator 50 to a purifying installation. On the other hand, a substantial portion of exhaust air of the treating chamber 11 may be returned to the heat exchanger 38 in a recirculated air operation, while the other portion is conducted via the exhaust air ventilator 50 to the purifying process.

Although it has not been shown in the drawings, the reflecting plate may of course be heated, instead of by the conduits through which a gel flows by any other manner, for example electrically.

We claim:

1. A method for drying a continuously formed material, impregnated with a hardenable synthetic resin, in a treating chamber, the method comprising:
   moving the continuously formed material along a path within the treating chamber;
   applying heat to the continuously formed material in the form of radiant heat and thereby drying the material;
   introducing preheated fresh air into the chamber in a direction which extends parallel to said path;
   directing the preheated fresh air in the chamber as a substantially laminar current of preheated fresh air parallel to the surface of the material as soon as the preheated fresh air is introduced into the chamber so as not to be blown directly on the material thereby diluting gaseous substances evaporating from the material when it is dried by the said application of the radiant heat; and
   at least partially exhausting the gaseous substances diluted by said preheated fresh air.

2. A method as claimed in claim 1 wherein,
   said introduction of preheated fresh air comprises the introduction of preheated fresh air having a temperature approximately equal to that of the radiant heat applied.

3. A method as claimed in claim 2 wherein,
   said application of the radiant heat to the continuously formed material comprises the application of radiant heat having a temperature between 160° and 200° to the continuously formed material; and
   said introduction of preheated fresh air comprises the introduction of preheated fresh air having a temperature between 140° and 180°.

4. A method as claimed in claim 3 wherein,
   said application of the radiant heat comprises the application of radiant heat having a temperature of 180°; and
   said introduction of preheated fresh air comprises the introduction of preheated fresh air having a temperature of 160°.

5. A method as claimed in claim 1 wherein,
   said directing of the preheated fresh air comprises providing a flow rate to the preheated fresh air directed in the direction in which the continuously formed material is moved of 1 to 3 m/sec.

6. A method as claimed in claim 1 wherein,
   said introduction of fresh air comprises introducing a larger amount of preheated fresh air than is exhausted with said gaseous substances after diluting said gaseous substances thereby maintaining a pressure within the chamber that is slightly excessive of the pressure of the environment outside the chamber.

7. A method as claimed in claim 1 wherein,
   said moving of the continuously formed material comprises moving the material upwardly in one portion of the treating chamber and moving the continuously formed material downwardly in another portion of the treating chamber; and further comprising
   moving the continuously formed material between said one portion of the treating chamber and said another portion of the treating chamber in a cooling chamber, and cooling the continuously formed material in the cooling chamber.

8. A method as claimed in claim 1 wherein,
   said application of radiant heat for drying the material comprises the application of different amounts of radiant heat across the width of the continuously formed material thereby drying the material differentially over its width.

9. A method as claimed in claim 1 wherein,
   said introduction of preheated fresh air into the chamber comprises introducing preheated fresh air into the chamber at two locations on the chamber, said two locations being spaced apart from each other in the direction in which the continuously formed material is moved in the chamber.

10. An apparatus for drying a continuously formed material impregnated with a hardenable synthetic resin, the apparatus comprising:
    at least one treating chamber through which the continuously formed material is passed;
    means along the inner periphery of said at least one treating chamber for generating radiant heat within said chamber for drying the material;
    means for directing preheated fresh air in said chamber in a direction parallel to the direction in which the continuously formed material is passed through the chamber for diluting gaseous substances evaporating from said chamber, said means for directing preheated fresh air comprising a fresh air inlet connected to said chamber for introducing fresh air into said chamber in said direction and for directing the fresh air along said direction in said chamber immediately after the fresh air is introduced so as not to be blown directly on the material and a preheater for preheating the fresh air introduced into said chamber by said inlet; and
    exhaust means connected to said chamber for at least partially exhausting the gaseous diluted substances.

11. An apparatus as claimed in claim 10 wherein,
    said at least one treating chamber is comprised of opposite walls between which the continuously formed material passes; and said means for generating radiant heat comprises a respective radiant heater having at least one conduit having a serpentine shape through which a heating medium is allowed to flow being disposed on the inner periphery of each of said opposite walls.

12. An apparatus as claimed in claim 11 and further comprising,
a reflecting plate covering each of the respective conduits of said radiant heaters disposed on said opposite walls, said reflecting plates disposed between the conduits of each of the respective radiant heaters and the continuous material passing through said treating chamber.

13. An apparatus as claimed in claim 11 wherein, said conduits are respectively embedded in said opposite walls of said treating chamber.

14. The apparatus as claimed in claim 11 wherein, said serpentine-shape of said conduits have a pitch that varies in the direction in which the continuously formed material passes through said chamber for providing a differential drying of the material in said direction.

15. An apparatus as claimed in claim 11 wherein, said at least one conduit of each of said respective radiant heaters comprises a plurality of separate and differentially fed conduits having a serpentine shape and spaced apart in the direction in which the continuously formed material passes through said treating chamber for providing a differential drying of the material in said direction.

16. An apparatus as claimed in claim 11 wherein, said at least one conduit of each of said respective radiant heaters comprises a plurality of separate and differentially fed conduits spaced apart in a direction transverse to the direction in which the continuously formed material is passed through said treating chamber for providing a differential drying of the material across the material in said transverse direction.

17. An apparatus as claimed in claim 10 and further comprising,
a sealed insulating chamber formed around said treating chamber and filled with hot air for insulating said treating chamber.

* * * * *